(12) United States Patent
Grundman (10) Patent No.: US 8,612,436 B1
(45) Date of Patent: Dec. 17, 2013

(54) REVERSE ENGINEERING CIRCUMVENTION OF SPAM DETECTION ALGORITHMS

(75) Inventor: Douglas Richard Grundman, Rosemont, PA (US)

(73) Assignee: Google Inc., Mountain View, CA (US)

( * ) Notice: Subject to any disclaimer, the term of this patent is extended or adjusted under 35 U.S.C. 154(b) by 106 days.

(21) Appl. No.: 13/246,363

(22) Filed: Sep. 27, 2011

(51) Int. Cl.
*G06F 7/00* (2006.01)
*G06F 17/30* (2006.01)

(52) U.S. Cl.
USPC .......................................... 707/735; 707/754

(58) Field of Classification Search
USPC ...................... 707/735, 999.2, 754
See application file for complete search history.

(56) References Cited

U.S. PATENT DOCUMENTS

| | | | |
|---|---|---|---|
| 7,831,667 B2 | 11/2010 | Gleeson et al. | |
| 2005/0015454 A1* | 1/2005 | Goodman et al. | 709/207 |
| 2005/0251496 A1* | 11/2005 | DeCoste et al. | 707/999.001 |
| 2008/0222725 A1* | 9/2008 | Chayes et al. | 726/23 |
| 2010/0094868 A1* | 4/2010 | Leung et al. | 707/726 |
| 2010/0223250 A1* | 9/2010 | Guha | 707/706 |
| 2012/0041846 A1* | 2/2012 | Rehman et al. | 705/27.1 |
| 2012/0268269 A1* | 10/2012 | Doyle | 340/539.13 |

OTHER PUBLICATIONS

B. Wu, V. Goel, and B. Davison. Propagating trust and distrust to demote web spam. In MTW'06: Proceeding of Models of Trust for the Web Workshop, International World Wide Web Conference, 2006. Retrieved on Feb. 22, 2013 from http://www.cse.lehigh.edu/~brian/pubs/2006/MTW/propagating-trust.pdf.*
Index of /~brian/pubs/2006. Verification of 2006 publication date of Wu Non-Patent Literature. Retrieved on Feb. 22, 2013 from http://www.cse.lehigh.edu/~brian/pubs/2006/.*

* cited by examiner

*Primary Examiner* — Apu Mofiz
*Assistant Examiner* — Bryan Walker
(74) *Attorney, Agent, or Firm* — Lerner, David, Littenberg, Krumholz & Mentlik, LLP (57) ABSTRACT

A spam score is assigned to a business listing when the listing is received at a search entity. A noise function is added to the spam score such that the spam score is varied. In the event that the spam score is greater than a first threshold, the listing is identified as fraudulent and the listing is not included in (or is removed from) the group of searchable business listings. In the event that the spam score is greater than a second threshold that is less than the first threshold, the listing may be flagged for inspection. The addition of the noise to the spam scores prevents potential spammers from reverse engineering the spam detecting algorithm such that more listings that are submitted to the search entity may be identified as fraudulent and not included in the group of searchable listings.

23 Claims, 4 Drawing Sheets

REVERSE ENGINEERING CIRCUMVENTION OF SPAM DETECTION ALGORITHMS

BACKGROUND

Various network-based search applications allow a user to enter search terms and receive a list of search results. Such applications commonly use ranking algorithms to ensure that the search results are relevant to the user's query. For example, some systems rank such results based on reliability and safety of the search result, location of the user and search result, etc. These services may also provide business listings in response to a particular search query.

The business listing search results, or data identifying a business, its contact information, web site address, and other associated content, may be displayed to a user such that the most relevant businesses may be easily identified. In an attempt to generate more customers, some businesses may employ methods to include multiple different listings to identify the same business. For example, a business may contribute a large number of listings for nonexistent business locations to a search engine, and each listing is provided with a contact telephone number that is associated with the actual business location. The customer may be defrauded by contacting or visiting an entity believed to be at a particular location only to learn that the business is actually operating from a completely different location. Such fraudulent marketing tactics are commonly referred to as "fake business spam".

In order to provide users with correct information, search engine companies occasionally modify their ranking algorithms to attempt to identify and exclude fake business spam listings from results presented to end users. Many spammers continually monitor changes in search engine rankings for their fake listings to determine when ranking algorithm changes occur and what those changes are. By reverse engineering spam identification aspects of the ranking algorithm, spammers can determine how to modify their fake listings to avoid spam-catching ranking penalties. Given the large number of spammers doing this, it is difficult for search engines to prevail.

SUMMARY

Aspects of the present disclosure relate generally to adding noise to spam scores to circumvent the reverse engineering of spam detection algorithms. A spam score value is assigned to a business listing when the listing is received at a search entity. The spam score may be between values of zero and one, where zero indicates that the listing is legitimate and one indicates that the listing is fraudulent. The spam score is then varied slightly by adding noise to the spam score. The amount of noise that is added is sufficient to affect spammer's attempts to reverse engineer spam-identification algorithms, but small enough so that the search experience of end users is minimally affected because the ranking of legitimate listings is unaffected.

In the event that the spam score is greater than a first threshold, the listing is identified as fraudulent and the listing is removed from or not included in the group of searchable business listings. In the event that the spam score is greater than a second threshold that is less than the first threshold, the listing may be demoted such that the listing does not appear in response to a search as frequently or as highly rated as listings having spam scores that are less than the second threshold. The amount of demotion may be affected by the spam score such that listings that appear to be more likely spam are demoted more than other listings. Alternatively, the listing may be flagged for inspection such that the listing may be further analyzed to determine whether the listing is fraudulent. In the event that the spam score is less than the first and second thresholds, the corresponding listing is identified as legitimate. The listing is then included in the group of searchable listings such that the listing may be provided in response to a search with no change to its ranking.

By varying the spam score, it becomes difficult for spammers to reverse engineer the spam detection algorithm. The amount by which the spam score is varied may change over time and may depend on an initial value of the spam score. Accordingly, spammers may not be able to easily reverse engineer the spam detection algorithms that are in place especially with regard to values corresponding to the first and second thresholds. The difficulty of deducing the effects of listing changes may increase greatly if those effects appear to be nondeterministic to spammers.

In one aspect, a computer-implemented method includes receiving a listing to be included in a group of searchable listings. Using a processor, a spam score is assigned to the listing and the spam score is varied. In the event that the spam score is larger than a first threshold, the listing is removed from or not including the listing in the group of searchable listings.

In another aspect, a computer-implemented method includes receiving a listing to be included in a group of searchable listings. Using a processor, a spam score value is assigned to the listing. Noise is added to the spam score value using the processor. In the event that the spam score value is larger than a first threshold, the listing is identified as potential spam.

In another aspect, a computer-implemented method for circumventing the reverse engineering of a spam detection algorithm includes receiving a listing to be included in a group of searchable listings. A spam score is assigned to the listing using a processor. The spam score indicates a likelihood that the listing is legitimate. The spam score is varied by adding noise to the spam score using the processor. In the event that the spam score is larger than a first threshold, the listing is removed from or not including the listing in the group of searchable listings. In the event that the spam score value is larger than a second threshold, the listing is identified as potential spam. The second threshold is less than the first threshold.

DETAILED DESCRIPTION

The present disclosure is directed to the addition of noise to spam scores to circumvent the reverse engineering of algorithms that seek to identify fraudulent business listings. A search entity receives new business listings to be added to a searchable group of listings on a regular basis. Each listing is processed to associate the listing with a spam score value that identifies a likelihood that the listing is fraudulent. In some embodiments, the spam score is between zero and one, where a score close to one indicates that the listing is likely spam and a score close to zero indicates that the listing is likely legitimate.

In cases where the listing is identified as likely being a fake business listing, different penalties are assigned to the listing based on the spam score value. For example, in the event that the spam score is greater than 0.95, the listing may be removed from the searchable group of listings because there is a strong likelihood that the listing is spam. In the event that the spam score is between 0.5 and 0.95, the listing may or may not actually be a fake business listing. In this case, the listing may not be removed from the group of searchable listings; but since the spam score indicates a likelihood that the listing is not legitimate, the listing may be demoted such that, for example, it does not appear as frequently or as highly rated in search results as other similarly situated business listings. If the spam score is less than 0.5, the listing may not be subject to any penalty.

Spammers frequently perform experiments by submitting fake data to a search entity and determining the result of a search targeting the fake data. In one example, a spammer may provide the search entity with different "spammy" listings that are each slightly different from each other. The listings are then targeted in a search by the spammer to determine which listings went essentially undetected by the spam identifying algorithms and are treated as legitimate, and which listings were determined by the search entity to be spam. Spammers also examine the order of results for searches for their own listings to determine which listings have been demoted, and to measure the relative demotion that occurs as a function of various features of those listings. This allows spammers to determine which listing features cause demotion (and how much) and which features are ignored by the spam scoring system. Accordingly, spammers can attempt to circumvent spam filters in order to have fake business listings appear as un-demoted search results.

In accordance with some aspects of the present disclosure, spam scores are varied slightly using a noise function. In the event that a spam score is near a penalty cutoff value, the spam score may not be varied too much because some "spammy" listings may avoid being penalized. The spam score variation may occur discretely such as whenever a search index is copied to production search machines. Spammers submit listings, wait for the search entity to copy an index and, based on the search results, attempt to decipher the result of the spam filter. As stated above, the addition of noise to spam scores may cause spammers to be continually frustrated by the outcome of their experiments.

An index is a set of data files underlying a search engine. The index may include listings from businesses that have submitted a listing to be added to the group of searchable listings. The index is organized so that the listings can be produced in response to a search based on the terms in each listing. A new index may be built every few weeks and then copied to production search machines, replacing the previous index data. Building the index includes (a) collecting data associated with the group of searchable listings, (b) merging duplicate and near-duplicate information, and removing any identifiable incorrect information, and (c) building the index structure such that listings can be located in response to the submission of search terms.

Spam filtering may occur at any one of three different times: 1) at the beginning of the indexing process, where listings that are obviously spam are removed; 2) near the end of the indexing process, where the listings are analyzed more thoroughly to judge whether or not the listing is spam; or 3) in an update stream, which is a separate process that receives updates in real time from users and applies the updates to an output index that is used in place of a former index. The index data may be processed to identify spam near the end of the index generation process before the index is copied to the production machines. Any spam listings are demoted, are flagged for inspection, or are removed so that they not included in the group of searchable listings.

It does not matter when during the index data processing that the noise is added to spam scores. But the noise may be added to the spam score of a listing before a decision is made whether to drop or demote the listing because: (a) if the listing is going to be demoted, the noise should be allowed to affect the amount of demotion or to push the listing over the drop threshold causing the listing to be dropped, or (b) if the listing is going to be dropped, the spam score is pushed over the demote threshold with small probability, causing the listing to be demoted. The noise function is shaped to identify an amount for the small probability. In some embodiments, the noise addition is performed as late in the process as possible to make coding easier.

Figure 1:
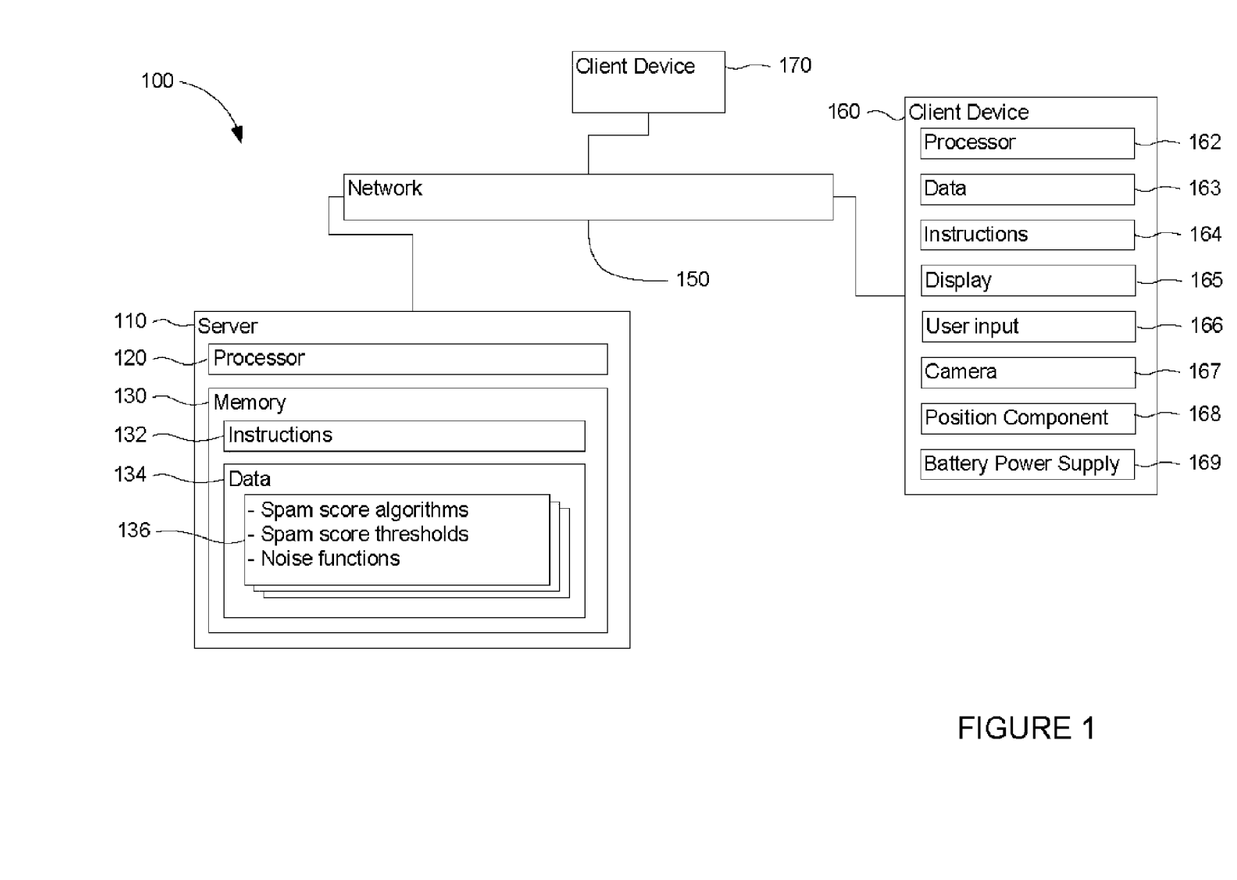
FIG. 1 is a functional diagram of a system in accordance with an example embodiment.
Figure 2:
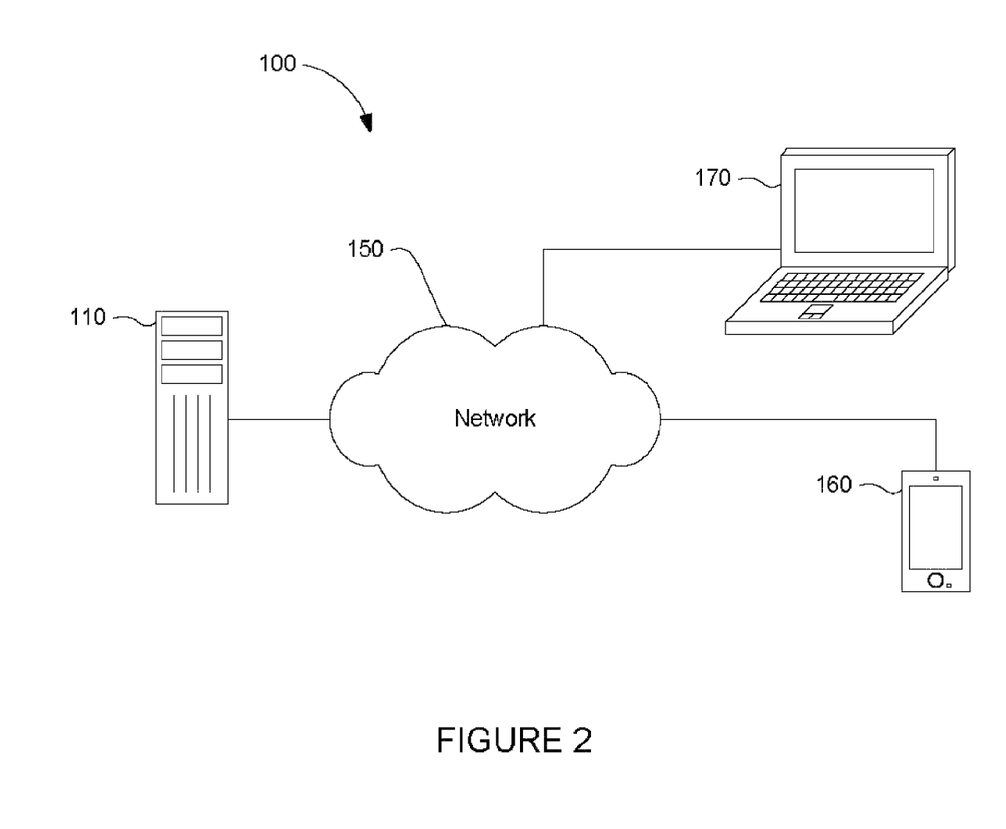
FIG. 2 is a pictorial diagram of the system of FIG. 1.

As shown in FIGS. 1 and 2, a system 100 in accordance with example embodiments includes a computer 110 containing a processor 120, memory 130 and other components typically present in general purpose computers. The memory 130 stores information accessible by the processor 120, including instructions 132 and data 134 that may be executed or otherwise used by the processor 120. The memory 130 may be of any type capable of storing information accessible by the processor 120, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by the processor 120 in accordance with the instructions 132. For instance, although the architecture is not limited by any particular data structure, the data may be stored in computer registers, in a relational database as a table having a plurality of different fields and records, etc. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data. Data 134 of server 110 may include data 136 corresponding to spam score algorithms, spam score thresholds and noise functions to be added to spam scores, which are described in detail below.

The processor 120 may be any conventional processor, such as a CPU for a personal computer. Alternatively, the processor 120 may be a dedicated controller such as an ASIC. Although FIG. 1 functionally illustrates the processor 120 and memory 130 as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, a computer or a memory will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160, 170 via network 150 such that server 110 uses network 150 to transmit and display information to a user on display 165 of client device 160. Server 110 may also comprise a plurality of computers that exchange information with different nodes of a network for the purpose of receiving, processing and transmitting data to the client devices 160, 170. In this instance, the client devices 160, 170 will typically still be at different nodes of the network than any of the computers comprising server 110.

Network 150, and intervening nodes between server 110 and client devices 160, 170, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, HTTP and SMTP, and various combinations of the foregoing. Although only a few computers are depicted in FIGS. 1 and 2, it should be appreciated that a typical system can include a large number of connected computers.

Each client device 160 may be configured similarly to the server 110, with a processor, memory and instructions as described above. Each client device 160 may be a personal computer intended for use by a person, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), and user input 166 (e.g., a mouse, keyboard, touch-screen or microphone). The client device 160 may also include a camera 167, geographical position component 168, accelerometer, speakers, a network interface device, a battery power supply 169 or other power source, and all of the components used for connecting these elements to one another.

In addition to the operations described below and illustrated in the figures, various operations in accordance with example embodiments will now be described. It should also be understood that the following operations do not have to be performed in the precise order described below. Rather, various steps can be handled in a different order or simultaneously, and may include additional or fewer operations.

Figure 3:
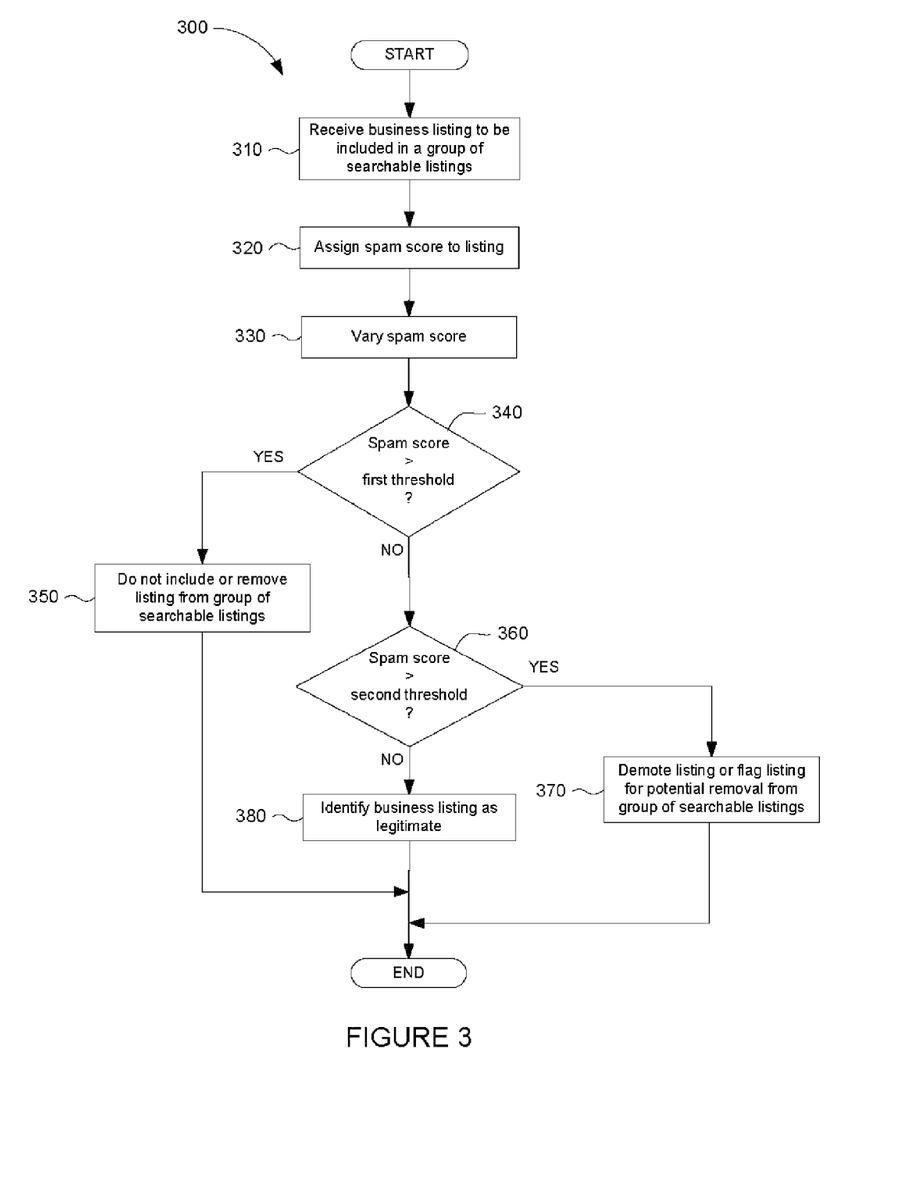
FIG. 3 is an exemplary flow diagram in accordance with an example embodiment.

FIG. 3 demonstrates a process 300 of adding noise to spam scores to circumvent the reverse engineering of spam detection algorithms. The process begins when a business listing is received at a search entity from a business that wants to have their listing included in a group of searchable business listings (block 310). The business may desire to increase traffic to a website or otherwise attract potential customers. Some of the listings that are received may be fraudulent such as those listings that may be identified as "fake business spam" that are submitted in an unscrupulous attempt to increase customer traffic.

In order to identify which listings may be fraudulent, a spam score is assigned to each listing (block 320). In some embodiments, the spam score may be between values of zero and one, where zero indicates that the listing is legitimate and one indicates that the listing is fraudulent. The spam score may be based on any number of factors or combinations of factors. Example factors include the geographic density of businesses in the same category, repeated identifying information in different listings, and ratios of common terms in the business listing title to total words in the title. It is understood that the spam score may be based on any number of known methods for determining whether a listing is fraudulent.

The spam score is varied (block 330). The spam score may be varied by adding a noise function to the spam score. The variations in the spam score, especially at specific boundaries on the spam score spectrum, lead to the difficulty in spammers being able to reverse engineer spam detection algorithms. The noise function and its application to the spam score are described in detail below with reference to FIGS. 4 and 5.

A determination is made whether the spam score is higher than a first threshold (block 340). In this example, the first threshold is desirably set at a value that is closer to 1 than 0.5 such that spam scores that are higher than the first threshold are determined to be likely fraudulent. In some embodiments, the first threshold is set at about 0.8. In the event that the spam score is greater than the first threshold, processing proceeds to block 350. Here, the listing is identified as fraudulent, and the listing is not included in (or removed from) the group of searchable business listings. Processing then terminates.

In the event that the spam score is not greater than the first threshold, processing proceeds to block 360. At block 360, a determination is made whether the spam score is higher than a second threshold. The second threshold is set at a value that is less than the first threshold such that a spam score that is higher than the second threshold but less than the first threshold is identified as corresponding to a listing that may or may not be fraudulent. In some embodiments, the second threshold is set at about 0.6.

In the event that the spam score is greater than the second threshold but less than the first threshold, processing continues to block 370. At block 370, the corresponding listing may be demoted such that the listing does not appear in response to a search as frequently or as highly rated as listings having spam scores that are less than the second threshold. Alternatively, the listing may be flagged for inspection such that the search entity may analyze the listing to determine a likelihood that the listing is fraudulent. Processing then terminates.

In the event that the spam score is less than the first and second thresholds, processing continues to block 380. At block 380, the corresponding listing is identified as legitimate. The listing is then included in the group of searchable listings such that the listing may be provided in response to a search. Processing then terminates.

As discussed above, an algorithm or combination of algorithms are used to provide each listing with a spam score value between 0.0 and 1.0, where 0.0 identifies the listing as likely legitimate and 1.0 identifies the listing as fraudulent.

Function B(x) is a function that defines a maximum amount of noise added to any given spam score. For example, if a listing has a spam score of 0.7, the value of the bound function B(0.7) may be 0.08. Accordingly, the maximum amount of noise that is applied to the listing is 0.08 such that the final spam score for this listing is between 0.62 and 0.78. Function B(x) maps [0, 1] to [0, 1] such that the input to the function B(x) is a value between 0 and 1 inclusive, and the output of the function B(x) is a value between 0 and 1 inclusive.

Function B(x) receives a spam score as input in the range of 0.0-1.0 inclusive, and outputs a spam score value in the range of 0.0-1.0 inclusive, where:

$$B(x) \leq x \qquad \text{Eq. 1}$$

$$B(x) \leq 1-x \qquad \text{Eq. 2}$$

A limit value (L) is defined to be a maximum amount of noise applied to a listing's spam score.

A simple "B" may be:

$$B(x) = K*(x-x^2)^2 \qquad \text{Eq. 3}$$

for some choice of K that ensures that the properties of Eqs. 1 and 2 are fulfilled.

Figure 4:
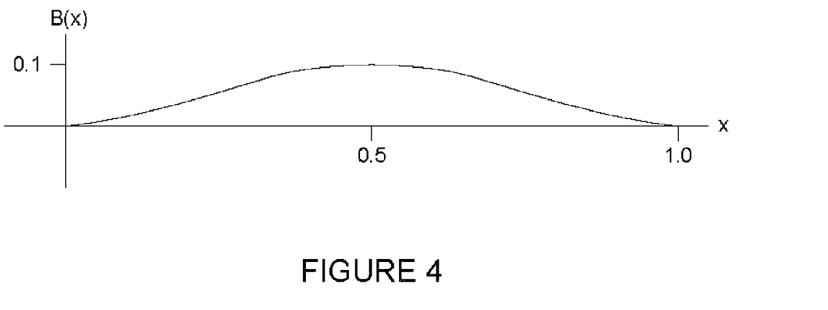
FIG. 4 illustrates a spam score variation function in accordance with an example embodiment.

The function has a maximum value at $x=\frac{1}{2}$ of 0.0625 when K=1. To get $0 \leq L \leq 1$, such that $B(x) \leq L$ for all x, K=L/0.0625. The example function B(x) that satisfies these parameters (with L=0.1) is shown in FIG. 4.

Letting "z" be a variable denoting a listing and "S" indicate a pre-existing spam function, and given a function "B" as in Eq. 3 and a random number generator "R" that has values distributed uniformly between −1.0 and 1.0 and that may use information from a listing for its seed value, a noise function "N" is defined on listings as:

$$N(z) = B(S(z))*R(z) \qquad \text{Eq. 4}$$

"R" may be a simple random number generator, or "R" may be a normalization of a hash of contents of "z" along with, for example, the date or the name of the index being built. This definition ensures that:

$$-B(S(z)) \leq N(z) \leq B(S(z)) \qquad \text{Eq. 5}$$

Combining with Eq. 1:

$$-S(z) \leq -B(S(z)) \leq N(z) \leq B(S(z)) \leq S(z) \qquad \text{Eq. 6}$$

A "noisy spam score" function S'(z) is defined as:

$$S'(z) = S(z) + N(z), \qquad \text{Eq. 7}$$

where function S'(z) has the following properties:

$$0 \leq S'(z) \leq 1 \qquad \text{Eq. 8}$$

$$S(z) - L \leq S'(z) \leq S(z) + L \qquad \text{Eq. 9}$$

When $S(z) = 0$, $S'(z) = 0$ \qquad Eq. 10

When $S(z) = 1$, $S'(z) = 1$ \qquad Eq. 11

S' also produces spam scores that can be used in place of S with no change to any other software component in the system.

The ultimate goal of any spam detection system is to penalize "spammy" content. Content is penalized by implementing various penalties according to the spam score a listing has garnered. Since there are only a finite number of different penalties than can be meted out (e.g., suppression of the listing, lowering the listing's prominence in search results, or doing nothing to the listing), there is a small number of key points on the continuum of spam scores, namely, the points that separate regions that incur different penalties.

For example, if the policy was to demote all listings with a score greater than 0.6, but completely block all listings with a score greater than 0.8, the two interesting points would be at 0.6 (the boundary between doing nothing and demotion) and 0.8 (the boundary between demotion and blocking). The addition of noise to a spam score proximate to a boundary point (e.g., within ±5%) may cause a corresponding listing having a spam to receive a score that is on the opposite side of the boundary, thereby receiving an inaccurate penalty.

There are two different possible effects caused by the addition of noise to spam scores. The first effect is that a listing on one side of a boundary point may receive enough noise to change the spam score value such that the value changes to the other side of the boundary point, giving the listing a different penalty. The second effect is that some penalties are parameterized by the spam score, so the noise changes the amount of the penalty. For example, listings with bigger spam scores may be demoted more than listings with lesser spam scores. Both of these outcomes will confuse spammers. Independent control may be gained over the two outcomes to make sure that legitimate listings are not penalized in an attempt to confound spammers.

Because of the properties of N, the value of S'(z) is close to the value of S(z) for any listing z. The values of S(z) and S'(z) differ by at most B(z), which is smaller than L. For most listings, if S causes z to be dropped, S' will also cause z to be dropped; and if S causes z to be demoted, S' will also cause z to be demoted. Because of the "noise" added, some listings are treated differently than they otherwise would be treated (e.g., demoted instead of dropped, or vice-versa). Demotion amounts may change slightly. For many pairs of listings, for example z and w, where values for S(z) and S(w) are close (e.g., <L), S(z)<S(w), but S'(z)>S'(w). So z and w are both demoted by a similar amount, and z and w may exchange places in the search results ranking.

Additional constraints may be imposed on the bound function to minimize the effect of noise on end-users. Accordingly, the effect of noise does not cause anyone to see substantially more spam than they would with a noiseless system. This result is achieved by shaping the bound function (B(x)) to be proximate to specific values at boundary points. The easiest way to achieve the desired result is by multiplying the bound function by a function that is near a value of 1.0 nearly everywhere, but that is also larger or smaller at the boundary points, depending on whether the effect of the boundary crossing is to be increased or decreased proximate to each boundary. Using Eq. 3 with L=0.1, one such bound function is:

$$B'(x) = \frac{B(x)}{(1 + e^{(-2000(x-0.6)^2)0.9}) \times (1 - e^{(-5000(x-0.8)^2)0.9})} \qquad \text{Eq. 12}$$

Figure 5:
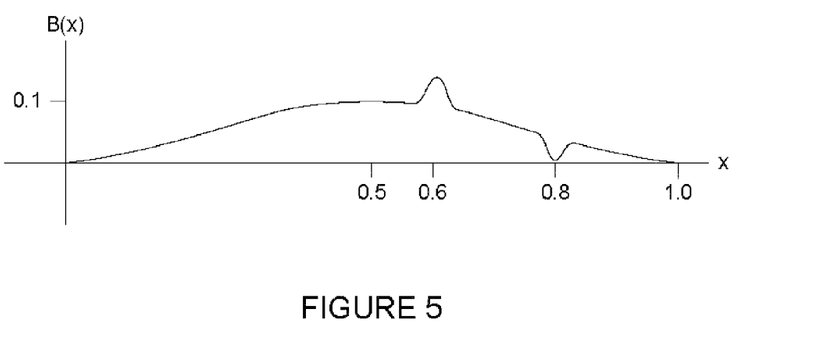
FIG. 5 illustrates a spam score variation function in accordance with an example embodiment.

Using B'(x) as defined in Eq. 12 instead of the original B(x) increases the effect (e.g., allows more noise) proximate to 0.6, and decreases the effect (e.g., suppresses more noise) proximate to 0.8, as shown in FIG. 5.

The values of "2000" and "5000" in Eq. 12 affect the steepness of the modification "bumps", and depend on where along the curve the corresponding "bump" occurs. The values of "0.6" and "0.8" indicate the boundary points. Each instance of 0.9 either removes 90% from or adds 90% to the noise at the corresponding boundary point. All of the values in Eq. 12 are configurable to achieve the effect desired. In general, to increase the amount of noise by a factor of X at spam score Y with steepness Z, an additional multiplicative term is added to the denominator of Eq. 12 of the form:

$$1+e^{-XZ(X-Y)^2}$$

To decrease the amount of noise by a factor of X at spam score Y with steepness Z, a multiplicative term is added to the denominator of Eq. 12 of the form:

$$1-e^{-XZ(X-Y)^2}$$

As described above, a spam score value is assigned to a business listing when the listing is received at a search entity. A noise function is added to the spam score such that the spam score is varied. In the event that the spam score is greater than a first threshold, the listing is identified as fraudulent and the listing is not included in (or is removed from) the group of searchable business listings. In the event that the spam score is greater than a second threshold that is less than the first threshold, the listing may be flagged for inspection. In the event that the spam score is less than the first and second thresholds, the corresponding listing is identified as legitimate. The addition of the noise to the spam scores prevents potential spammers from reverse engineering the spam detecting algorithm such that more "spammy" listings that are submitted to the search entity may be identified as fraudulent and not included in the group of searchable listings.

As these and other variations and combinations of the features discussed above can be utilized without departing from the scope of the claims, the foregoing description of exemplary embodiments should be taken by way of illustration rather than by way of limitation. It will also be understood that the provision of examples (as well as clauses phrased as "such as," "e.g.", "including" and the like) should not be interpreted as limiting; rather, the examples are intended to illustrate only some of many possible aspects.

The invention claimed is:

1. A computer-implemented method comprising:
receiving a listing to be included in a group of searchable listings;
assigning, using a processor, a first spam score in a predetermined range to the listing;
varying the first spam score to a second spam score using the processor, wherein varying the first spam score includes:
varying the first spam score according to a first function if the first spam score is within a first subset of the predetermined range, and
varying the first spam score according to a second function if the first spam score is within a second subset of the predetermined range, the second function being different than the first function; and
in the event that the second spam score is larger than a first threshold, removing the listing from or not including the listing in the group of searchable listings.

2. The method of claim 1, further comprising, in the event that the second spam score is larger than a second threshold, identifying the listing as potential spam.

3. The method of claim 2, wherein the second threshold is less than the first threshold.

4. The method of claim 2, wherein the listing identified as potential spam is flagged to determine whether the listing is to be removed from or not included in the group of searchable listings.

5. The method of claim 2, wherein the listing identified as potential spam is demoted such that the listing does not appear as frequently or as highly ranked as other similarly situated listings in response to a search of the group of searchable listings.

6. The method of claim 2, wherein varying the first spam score according to the first function comprises:
adding a noise function to the spam score using the processor.

7. The method of claim 6, wherein the second function varies the first spam score by a larger amount than the first function when the first spam score value is proximate to one of the first threshold and the second threshold.

8. The method of claim 7, wherein varying the first spam score according to the second function comprises:
increasing the first spam score when the first spam score is proximate to the second threshold.

9. The method of claim 7, wherein varying the first spam score according to the second function comprises:
decreasing the first spam score when the first spam score is proximate to the first threshold.

10. The method of claim 1, further comprising,
in the event that the second spam score value is less than a second threshold, including the listing in the group of searchable listings.

11. A computer-implemented method comprising:
receiving a listing to be included in a group of searchable listings;
assigning, using a processor, a first spam score value to the listing;
varying the first spam score value to a second spam score value using the processor, wherein varying the first spam score includes:
varying the first spam score according to a first function if the first spam score is within a first subset of the predetermined range, the first function including a noise component, and
varying the first spam score value according to a second function if the first spam score value is within a second subset of the predetermined range, the second function including a non-noise component; and
in the event that the second spam score value is larger than a first threshold, identifying the listing as potential spam.

12. The method of claim 11, further comprising, in the event that the second spam score value is larger than a second threshold, removing the listing from the group of searchable listings.

13. The method of claim 12, wherein the second threshold is greater than the first threshold.

14. The method of claim 13, wherein varying the first spam score value according to the second function varies the first spam score value by a larger amount than the first function when the spam score value is proximate to one of the first threshold and the second threshold.

15. The method of claim 13, wherein varying the first spam score value according to the second function comprises:
increasing the first spam score value in the event that the first spam score is proximate to the first threshold.

16. The method of claim 13, wherein varying the first spam score value according to the second function comprises:
decreasing the first spam score value in the event that the first spam score is proximate to the second threshold.

17. A computer-implemented method for circumventing the reverse engineering of a spam detection algorithm, the method comprising:
receiving a listing to be included in a group of searchable listings;

assigning a first spam score within a predetermined range to the listing using a processor, wherein the first spam score indicates a likelihood that the listing is legitimate;

varying the first spam score to a second spam score using the processor, wherein varying the first spam score includes:

varying the first spam score according to a first function if the first spam score is within a first subset of the predetermined range, varying the first spam score according to a second function if the first spam score is within a second subset of the predetermined range, the second function including a non-noise component, and varying the first spam score according to a third function if the first spam score is within a third subset of the predetermined range, the third function including a non-noise component and being different from the second function;

in the event that the second spam score is larger than a first threshold, removing the listing from or not including the listing in the group of searchable listings; and in the event that the second spam score value is larger than a second threshold, identifying the listing as potential spam, wherein the second threshold is less than the first threshold.

18. The method of claim 17, wherein the listing identified as potential spam is flagged to determine whether the listing is to be removed from or included in the group of searchable listings.

19. The method of claim 17, wherein the listing identified as potential spam is demoted such that it does not appear as frequently or as highly ranked as other similarly situated listings in response to a search of the group of searchable listings.

20. The method of claim 17, wherein varying the first spam score according to one of the second function and the third function comprises:

varying the spam score by a larger amount when the first spam score value is proximate to one of the first threshold and the second threshold.

21. The method of claim 17, wherein varying the first spam score according to the second function comprises:

increasing the first spam score when the spam score is proximate to the second threshold.

22. The method of claim 17, wherein varying the first spam score according to the third function comprises:

decreasing the spam score when the spam score is proximate to the first threshold.

23. The method of claim 17, in the event that the spam score is less than the second threshold, including the listing in the group of searchable listings.

* * * * *